US009077253B2

(12) United States Patent
Adragna

(10) Patent No.: US 9,077,253 B2
(45) Date of Patent: Jul. 7, 2015

(54) CONTROL INTEGRATED CIRCUIT FOR A POWER TRANSISTOR OF A SWITCHING CURRENT REGULATOR

(71) Applicant: STMicroelectronics S.r.l., Agrate Brianza (IT)

(72) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 376 days.

(21) Appl. No.: 13/689,422

(22) Filed: Nov. 29, 2012

(65) Prior Publication Data

US 2013/0088897 A1    Apr. 11, 2013

Related U.S. Application Data

(63) Continuation-in-part of application No. PCT/EP2011/058766, filed on May 27, 2011.

(51) Int. Cl.
*H02M 3/335* (2006.01)
*H02M 7/217* (2006.01)
*H02M 1/00* (2007.01)

(52) U.S. Cl.
CPC ........ *H02M 3/3353* (2013.01); *H02M 3/33523* (2013.01); *H02M 3/33507* (2013.01); *H02M 7/2176* (2013.01); *H02M 2001/0022* (2013.01)

(58) Field of Classification Search
CPC ................ H02M 3/33523; H02M 3/33507
USPC ............................ 363/21.12–21.18
See application file for complete search history.

(56) References Cited

U.S. PATENT DOCUMENTS

| 5,729,443 | A | 3/1998 | Pavlin |
| 6,356,466 | B1 | 3/2002 | Smidt et al. |
| 6,707,283 | B1 | 3/2004 | Ball |
| 6,721,192 | B1 | 4/2004 | Yang et al. |
| 6,853,563 | B1 | 2/2005 | Yang et al. |
| 7,035,119 | B2* | 4/2006 | Koike .......... 363/21.13 |
| 7,388,764 | B2 | 6/2008 | Huynh et al. |
| 7,486,528 | B2* | 2/2009 | Yang .......... 363/21.12 |
| 7,505,287 | B1 | 3/2009 | Kesterson |

(Continued)

OTHER PUBLICATIONS

Bailly, A., "Constant Output Current for Flyback Converters with VIPer31," Technical Note, AN1073/0698, STMicroelectronics, 10 pages, 1998.

(Continued)

*Primary Examiner* — Jue Zhang
(74) *Attorney, Agent, or Firm* — Seed IP Law Group PLLC

(57) ABSTRACT

An integrated circuit controls a switch of a switching current regulator. The current regulator includes primary and secondary windings where a first and a second current flow, respectively. The switch is adapted to initiate or interrupt the circulation of the first current in the primary winding. The control integrated circuit includes a comparator configured to compare a first signal representative of the first current to a second signal and a divider circuit configured to generate the second signal as a ratio of a third signal, proportional to a voltage on the primary winding, with a voltage on a capacitor. The capacitor is charged by a further current controlled by the third signal when the second current is different from zero. The capacitor is discharged through a parallel-connected resistor when the value of said second current is substantially zero.

21 Claims, 5 Drawing Sheets

(56) References Cited

U.S. PATENT DOCUMENTS

| | | |
|---|---|---|
| 7,525,259 B2 | 4/2009 | Weirich |
| 7,639,516 B2 * | 12/2009 | Usui et al. .................. 363/21.12 |
| 7,738,227 B2 * | 6/2010 | Fang et al. .................. 361/93.1 |
| 2004/0218405 A1 | 11/2004 | Yamada et al. |
| 2007/0035285 A1 | 2/2007 | Balakrishnan et al. |
| 2008/0259656 A1 | 10/2008 | Grant |
| 2009/0059632 A1 | 3/2009 | Li et al. |
| 2009/0073725 A1 | 3/2009 | Lin |

OTHER PUBLICATIONS

Adragna, C., "Design Equations of High-Power-Factor Flyback Converters Based on the L6561," AN1059 Application Note, STMicroelectronics, 20 pages, Sep. 2003.

* cited by examiner

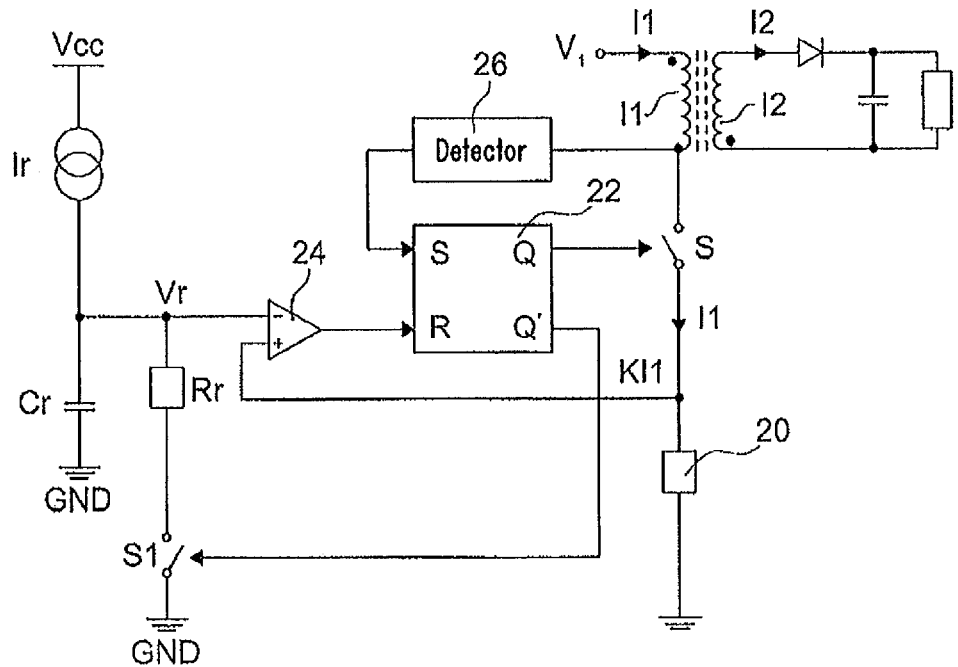
Fig.1 *(Prior Art)*
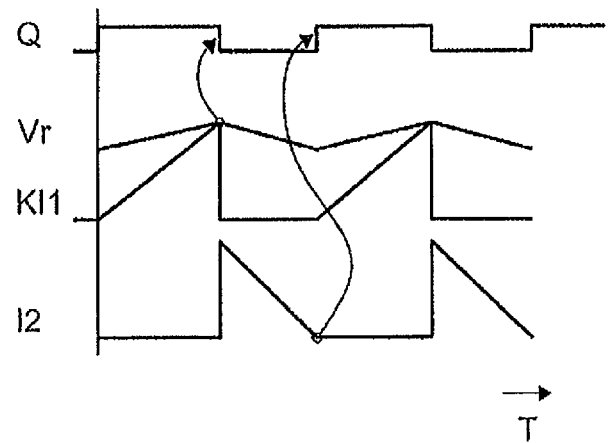
Fig.2
*(Prior Art)*

CONTROL INTEGRATED CIRCUIT FOR A POWER TRANSISTOR OF A SWITCHING CURRENT REGULATOR

BACKGROUND

1. Technical Field

The present disclosure relates to a control integrated circuit for a power transistor of a switching current regulator.

The proposed control integrated circuit is more directly employed in offline converters, and in particular in those employing the flyback topology.

2. Description of the Related Art

Offline converters typically have a so-called isolation barrier, i.e., including two galvanically separate parts. One so-called primary side, configured to be connected to an electricity power line through a rectifier bridge, usually includes a switch (typically a MOSFET), the opening and closure of which is suitably driven so as to regulate the power flow, and a controller for controlling the switch. A so-called secondary side is isolated from the primary side and connected to a load to be supplied by an output terminal of the secondary side.

The galvanic isolation, specified by safety standards, is ensured by the presence of a transformer. The transformer, configured so as to provide a suitable isolation, established by the legal regulations, allows the energy to pass from one side to the other by magnetic coupling, without metal contact therebetween.

In all converters either the output voltage or the output current is to be regulated, i.e., maintained at constant value as the operating conditions change (input voltage, output load, temperature). In this context the focus is on switching current regulators, then the output current is the quantity to be regulated. This objective is typically achieved by using a feedback control: the output current, or a portion thereof, is compared with a reference value; their difference is suitably amplified (error signal) and processed by a control circuit (controller) in order to determine the turn-on and turn-off time of the switch so as to zero or minimize the aforesaid error signal.

At this point, a problem arises in offline converters: the output current is on the secondary side while the control and the MOSFET are on the primary side. Therefore, the error signal should be transferred from one side to the other, i.e., the isolation barrier should be crossed in the opposite direction and, according to the safety regulations, the same isolation as the transformer should be at least ensured. A solution to this problem consists in using another small transformer or an optocoupler.

However, due to cost problems, it is desirable to regulate the output current without using a feedback loop; in such a case the optocoupler is no longer used.

A flyback converter which is provided with a regulation of the output current operated on the primary side of the transformer is described in U.S. Pat. No. 5,729,443. The flyback converter, shown in FIG. 1, comprises a sensor 20 which detects the current flowing in the power transistor S (indicated by a switch) connected to the primary winding 11, in turn connected to the input voltage V1. The flyback converter also includes a set-reset flip-flop 22 the output Q of which controls the power transistor S, the reset input R of which receives the output of a comparator 24 and the set input S of which receives the output of a demagnetization detection device 26 connected to a terminal of the primary winding. The comparator 24 is adapted to compare the detected voltage K*I1 with a reference voltage Vr. When the power transistor S is on, the current I2 on the secondary 12 of the transformer is null, as seen in FIG. 2. When the detected voltage K*I1 reaches the reference voltage Vr, the comparator 24 resets the flip-flop 22 which turns the transistor S off and the current I1 becomes null. The current I2 reaches its peak and then regularly decreases until reaching zero, which indicates the demagnetization of the magnetic core. The demagnetization is detected by the circuit 26 which sends the set signal to the flip-flop 22 to turn the transistor S on.

The flyback converter comprises circuitry coupled to the power supply voltage Vcc and adapted to vary the reference voltage Vr with the variations of the switching duty cycle. The circuitry includes a capacitor Cr having a first terminal connected to ground GND and a second terminal at which the reference voltage Vr is produced and provided to the inverting input of the comparator 24. The circuitry also includes a reference current generator, which produces a reference current Ir, connected between the power supply voltage Vcc and the second terminal of the capacitor Cr. The capacitor Cr is arranged in parallel to a series of a resistor Rr and a switch S1 connected to ground GND and controlled by the output Q*, i.e., the negated output Q of the flip-flop 22. FIG. 2 shows the time diagrams of the signals S, Vr, KI1 and I2.

Therefore, said control device operates with a continuous input voltage and does not work properly in the case of a rectified input voltage, such as in the case of a flyback converter with high power factor, i.e., higher than 0.9.

BRIEF SUMMARY

One embodiment of the present disclosure is a control integrated circuit for a power transistor of a switching current regulator which is able to operate with a rectified, sinusoidally variable input voltage.

One embodiment is an integrated circuit for controlling a switch of a switching current regulator. The current regulator includes a primary winding and a secondary winding coupled with the primary winding. The primary winding and secondary winding are passed through by first and second currents, respectively, and the primary winding is coupled to a voltage proportional to an alternating voltage rectified by rectifier. The switch is adapted to allow or prevent the circulation of said first current in the primary winding. The control integrated circuit includes a comparator adapted to compare a first signal representative of said first current with said second signal. The integrated circuit also includes a signal generator adapted to generate said second signal as a ratio of a third signal proportional to the rectified voltage with the voltage at the terminals of at least one capacitor outside the control integrated circuit. The at least one capacitor is charged by a further current controlled by said third signal when said second current is different from zero and is discharged through at least one resistor when the value of said second current is substantially null. Actually, in one embodiment the resistor is always connected in parallel to the at least one capacitor, so when the signal generator is ON, the at least one capacitor is charged with a lower current; when the generator is OFF, the at least one capacitor is discharged through the resistor.

BRIEF DESCRIPTION OF THE SEVERAL VIEWS OF THE DRAWINGS

The features and advantages of the present disclosure will become apparent from the following detailed description of a practical embodiment thereof, illustrated by way of non-limiting example in the accompanying drawings, in which:

FIG. 1 is a circuit scheme of a switching current regulator using a flyback converter in accordance with the known art;

FIG. 2 shows the time diagrams of some signals involved in the flyback converter in FIG. 1;

DETAILED DESCRIPTION

Figure 3:
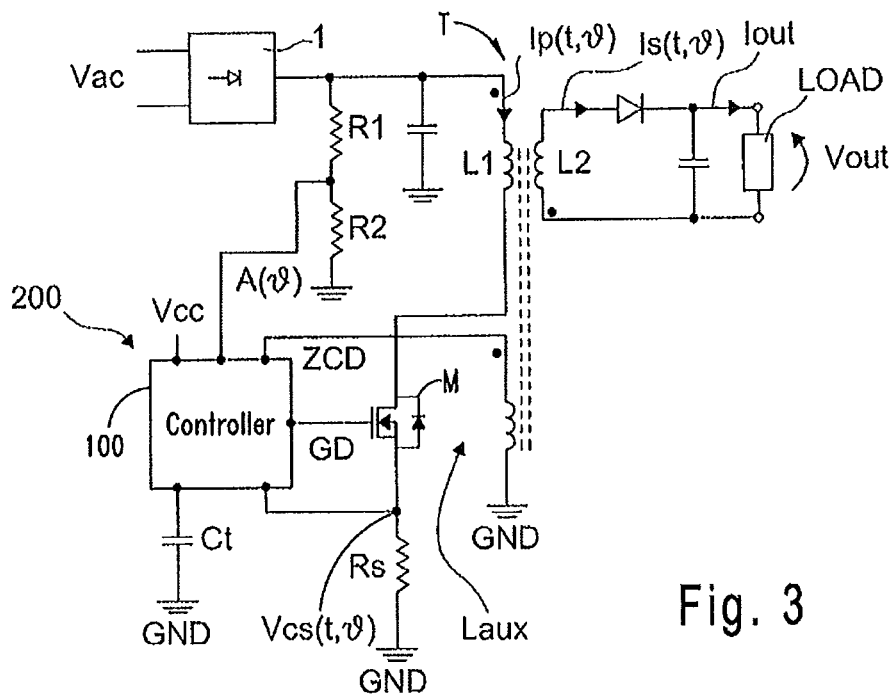
FIG. 3 is a circuit scheme of a switching current regulator, in particular of a flyback converter, with a control integrated circuit for the power transistor in accordance with the present disclosure.

FIG. 3 is a circuit diagram of a switching current regulator, in particular of a flyback converter, in accordance with the present disclosure. The flyback converter comprises a diode rectifier bridge 1 adapted to rectify an input alternating voltage Vac, and a transformer T comprising a primary winding L1, a secondary winding L2 and an auxiliary winding Laux. A current $Ip(\theta, t)$ flows through the primary winding L1 and a current $Is(\theta, t)$ flows through the secondary winding, $\theta$ being the phase angle of the instantaneous network voltage. A power transistor M, e.g., a transistor MOS, is connected to the primary winding L1 and is coupled to ground GND by a sense resistor Rs. The resistor Rs allows the current $Ip(\theta, t)$ flowing in the primary winding L1 to be detected via a voltage $Vcs(\theta, t)$.

The flyback converter also includes a control device 200 which includes a capacitor Ct and an integrated circuit controller 100 that is configured to control the power transistor M. A resistive divider, comprised of resistors R1, R2, is configured to provide a voltage $A(\theta)$ that is proportional to the rectified ac input voltage available at the output of the diode bridge 1.

The switching period is given by T=Ton+Tfw+Tr where Ton is the turn-on time of transistor M, Tfw is the time period when the current circulates on the secondary side of the flyback converter, i.e., on the inductor L2 and the elements connected thereto, and Tr is a delay time period which follows Tfw, intentionally inserted to turn the transistor M on, when its drain-source voltage reaches the minimum value. The time periods Ton, Tfw and Tr are determined by the integrated circuit controller 100 that drives the gate of the transistor MOS M. With the control method employed, the time period Ton is constant in a line cycle while the time period Tfw (and therefore the period of switching time T as well) are functions of the phase angle $\theta$ of the instantaneous network voltage. The transistor M may belong to the integrated circuit 100 or may be external thereto.

Figure 4:
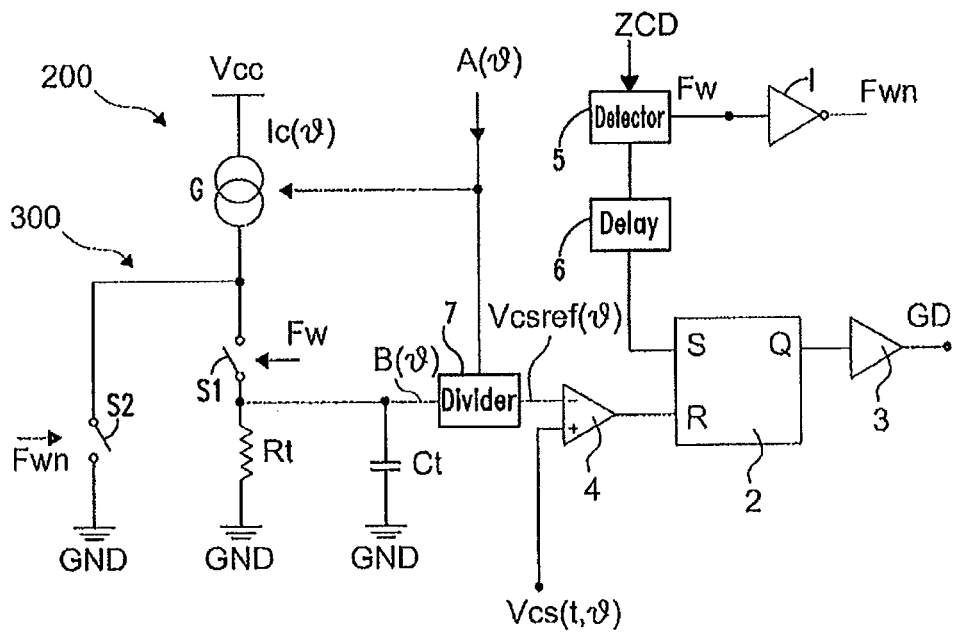
FIG. 4 is a more detailed circuit scheme of the control integrated circuit in FIG. 3.

FIG. 4 is a detailed circuit diagram of the integrated circuit controller 200. The integrated circuit controller 100 comprises a set-reset flip-flop 2 having set and reset inputs and an output Q. The output Q controls the power transistor M via a driver 3. The reset input R receives the output of a comparator 4 adapted to compare the voltage $Vcs(\theta, t)$ across the terminals of the resistor Rs with a voltage $Vcsref(\theta)$. The set input S of the flip-flop 2 receives the output, delayed a delay Tr by a delay element 6, of a demagnetization detection device 5 coupled with the primary winding L1. In particular, the detection device 5 receives a signal ZCD of the auxiliary winding Laux. When the power transistor M is turned on during the time Ton, the current $Is(\theta, t)$ on the secondary L2 of the transformer is substantially null. When the detected voltage $Vcs(\theta, t)$ reaches the reference voltage $Vcsref(\theta)$, the comparator 4 resets the flip-flop 2 which turns the transistor M off and the current $Ip(\theta, t)$ becomes substantially null. The current $Is(\theta, t)$ reaches its peak and then linearly diminishes until reaching zero, which indicates the demagnetization of the magnetic core. The demagnetization detector 5 detects the demagnetization via the signal ZCD and has a first output that sends the set signal S to the flip-flop 2 to turn the transistor M on after the delay Tr provided by the delay element 6.

The demagnetization detector 5 also is configured to provide at a second output a signal FW that indicates when the current $Is(\theta, t)$ is circulating in the secondary winding L2 of the transformer, i.e., in the time period Tfw. The second output of the detector 5 is coupled to the input of an inverter I having an output that provide a signal Fwn that is a negated version of the signal Fw.

A dividing block 7 has a first input configured to receive the voltage $A(\theta)$ from the resistive divider R1, R2, a second input configured to receive voltage $B(\theta)$, and an output configured to provide the voltage $Vcsref(\theta)$. The voltage $B(\theta)$ is taken at a first terminal of the capacitor Ct which has a second terminal connected to ground GND. The voltage $Vcsref(\theta)$ is given by the ratio of the voltages $A(\theta)$ and $B(\theta)$. The capacitor Ct, having a value preferably greater than 0.5 microfarads so that the voltage $B(\theta)$ is almost continuous in each semi-cycle of the line voltage.

A charging and discharging device 300 is configured to charge and discharge the capacitor Ct. The device 300 includes a resistor Rt, a current generator G, and first and second switches S1, S2. The resistor Rt is arranged in parallel to the capacitor Ct and connected to ground GND. The current generator G is configured to generate a current $Ic(\theta)$ and is connected to a power supply terminal configured to provide a supply voltage Vcc. The first switch S1 is controlled by the output signal FW from the detector 5 and selectively couples the current generator G to the resistor Rt and capacitor Ct. The current generator G is controlled by the signal $A(\theta)$ so that the current $Ic(\theta)$ has a value proportional to the voltage $A(\theta)$. The supply voltage Vcc may coincide with or be different from the supply voltage of the integrated circuit controller 100. The same current generator G is selectively coupled to ground GND by the second switch S2, controlled by the signal FWn, i.e., the negated signal FW.

The signal FW is only at the high logic level when the current $Is(\theta, t)$ is circulating in the secondary winding L2 of the transformer, i.e., in the time period Tfw. The switch S1 enables the current generator G to charge the capacitor Ct in such a time period Tfw; and the power transistor M is turned off during the time period Tfw. When the power transistor M is turned on in the time period Ton, the switch S1 is open while the switch S2 is closed, thus deviating the current $Ic(\theta)$ towards ground GND and allowing the capacitor Ct to be discharged through the resistor Rt. Alternatively, the signal FW could directly control the current generator G and keep it turned on when the signal FW is at the high logic level, e.g., at the value of the supply voltage, and turn it off when it is at the low logic level, e.g., at ground GND.

If we consider that $\theta$ is between 0 and $\pi$, the absolute value may be omitted in the following explicit expressions of quantities being functions of $\theta$.

Figure 5:
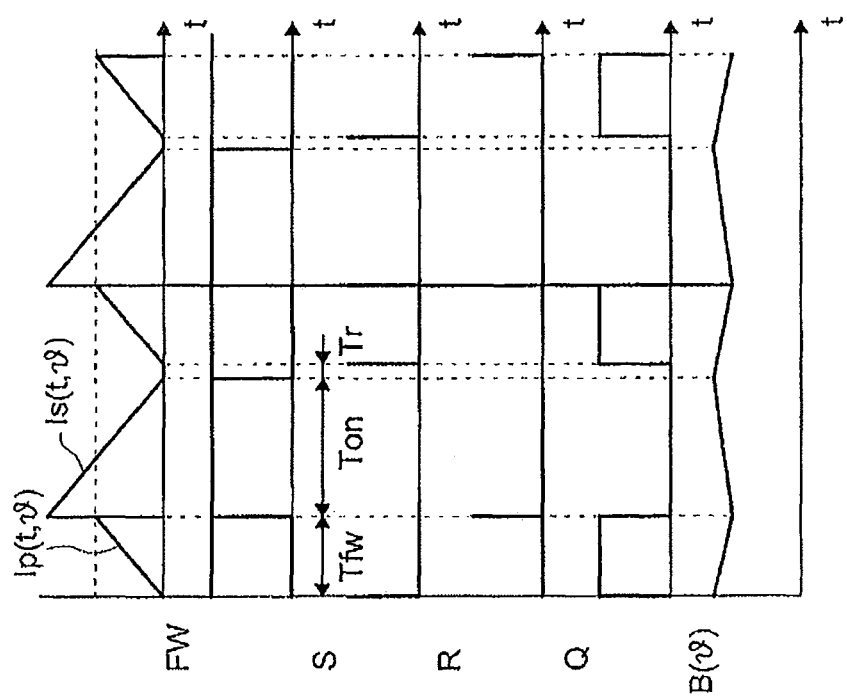
FIG. 5 shows the time diagrams in the time scale of the switching cycle of some signals involved in the flyback converter in FIG. 3.

Thereby, $A(\theta)=Kp*\sin\theta$, where Kp is a constant value (equal to the partition ratio of the resistors R1, R2 in FIG. 3), and the envelope of the current peaks on the winding L1 is given by $Ip(\theta)=Ipk*\sin\theta$, where Ipk is the peak of current $Ip(\theta)$, while that on winding L2 is $Is(\theta)=n*Ipk*\sin\theta$ where n is the transformation ratio of the primary L1 with the secondary L2. Given that the current Is(θ) has a triangular waveform (as seen in FIG. 5) its average in a switching cycle is given by:

$$Ism = \frac{1}{2}*(n*Ipk*\sin\vartheta)*\frac{Tfw}{T}, Ism = \frac{1}{2}n \cdot Ipk\frac{Tfw(\vartheta)}{T(\vartheta)}\sin\vartheta.$$

The output current Iout, i.e., the current flowing through the load LOAD, is the average of the current Ism on a semi-cycle:

$$Iout = \frac{1}{2\pi}Ipk \int_0^\pi \frac{Tfw(\vartheta)}{T(\vartheta)}\sin\vartheta d\vartheta.$$

The voltage B(θ) is the voltage developed at the terminals of the capacitor Ct by a charging and discharging device 300 of the capacitor Ct; said device 300 comprises charging the same capacitor Ct by means of a current generator Ic(θ) which is only active when the current is circulating on the secondary side, i.e., on the winding L2 and on the elements connected thereto, i.e., during the time period Tfw. The current generator generates a current Ic(θ)=Gm*A(θ)=Gm*Kp*sin θ, where Gm is the transconductance of the controlled generator of current Ic(θ).

Under steady-state operating conditions, there is a charge balance for capacitor Ct given by B(θ)*T(θ)/Rt=Ic(θ)*Tfw(θ). Therefore:

$$B(\vartheta) = Rt \cdot Gm \cdot Kp\frac{Tfw(\vartheta)}{T(\vartheta)}\sin\vartheta.$$

Figure 6:
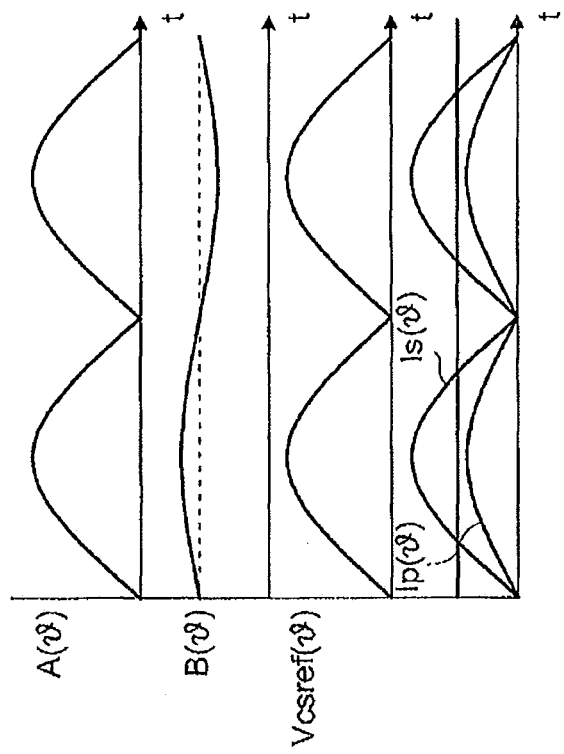
FIG. 6 shows the time diagrams in the time scale of the line cycle of some signals involved in the flyback converter in FIG. 3.

Assuming that the capacitor Ct is sized such that the alternating component of voltage B(θ) is negligible with respect to the continuous component B given by the average of B(θ) (as seen in FIG. 6) occurs:

$$B(\vartheta) \approx B = \frac{1}{\pi}Rt \cdot Gm \cdot Kp \int_0^\pi \frac{Tfw(\vartheta)}{T(\vartheta)}\sin\vartheta d\vartheta.$$

Whereby the voltage Vcsref(θ) is given by:

$$Vcsref(\vartheta) = \frac{A(\vartheta)}{B(\vartheta)} \approx \frac{A(\vartheta)}{B} = \frac{\pi}{Rt \cdot Gm \int_0^\pi \frac{Tfw(\vartheta)}{T(\vartheta)}\sin\vartheta d\vartheta}\sin\vartheta,$$

i.e., the envelope of the current peaks on the primary winding defined by Vcsref(θ)/Rs is sinusoidal and therefore a high power factor is obtained. Considering that when Vcsref(θ)=Vcs(θ, $T_{ON}$), we have Vcsref(θ)/Rs=Ip(θ)=Ipk*sin θ, and then:

$$Ipk = n\frac{\pi}{Rs \cdot Rt \cdot Gm \int_0^\pi \frac{Tfw(\vartheta)}{T(\vartheta)}\sin\vartheta d\vartheta}$$

and $$Iout = \frac{n}{2Rs \cdot Gm \cdot Rt}.$$

Therefore, the output current Iout does not depend on the output load, neither on the switching frequency nor on the input voltage, but only on the parameters selected by the user, i.e., n and Rs, and on fixed parameters, i.e., Gm and Rt. Therefore, the system acts as a current regulator. Thereby, the set objective has been achieved.

Figure 7:
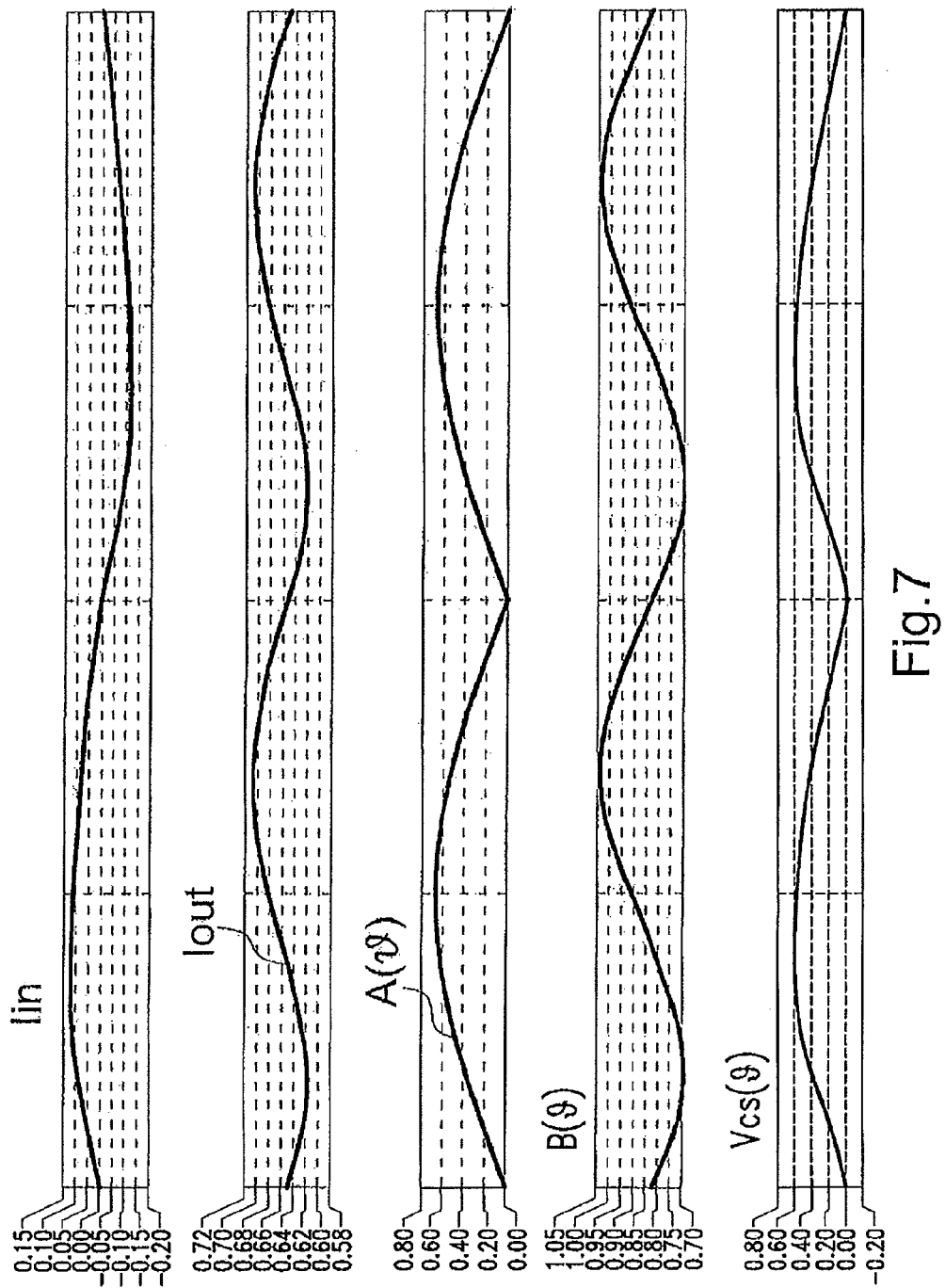
FIGS. 7-8 are time diagrams of some signals deriving from simulations on the flyback converter in FIG. 3.
Figure 8:
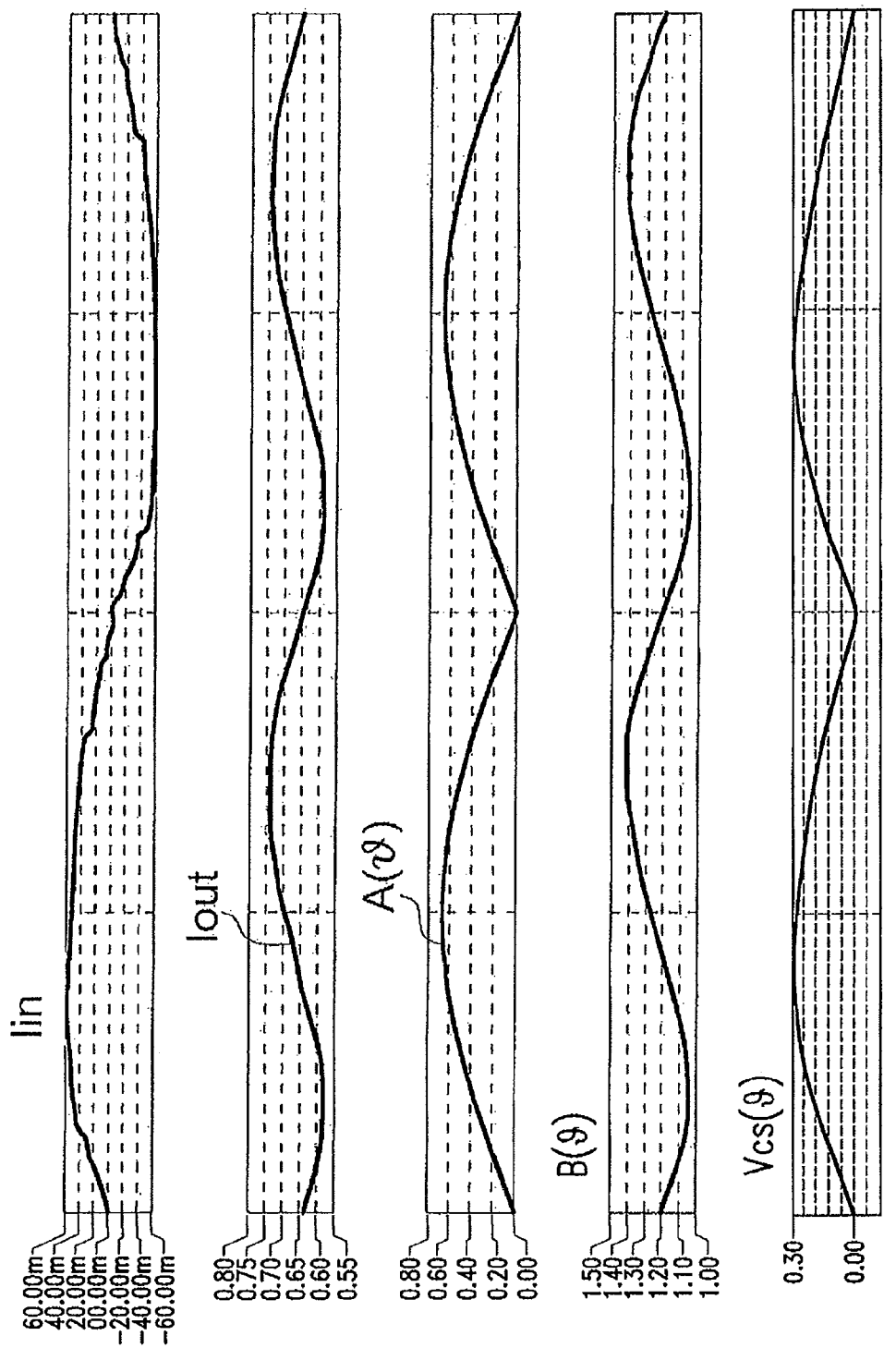

FIGS. 7 and 8 show the time diagrams of the signals involved in the flyback converter in FIG. 3, deriving from simulations made by using a capacitor Ct=1 microfarad, an input voltage of 115 Vac and an output resistance varying from 17.1 ohms (FIG. 7) to 8.57 ohms (FIG. 8). Time diagrams of input current Iin, voltage A(θ), voltage B(θ), output current Iout, and voltage Vcs(θ) are shown. It is noted that the average value of the output current Iout is kept constant as the load varies, in such a case the output resistance.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for controlling a first switch of a switching current regulator, said control circuit comprising:
   a comparator configured to compare a first signal, representative of a first current through a primary winding of the switching current regulator, with a second signal;
   a charge/discharge circuit configured to selectively charge and discharge a capacitor; and
   a divider circuit configured to generate said second signal as a ratio of a third signal, proportional to a the input voltage of the switching current regulator, to a voltage on the capacitor.

2. A control circuit according to claim 1, wherein the divider circuit is configured to cause the comparator to open said first switch when said first signal equals said second signal, the control circuit further comprising a demagnetizing detector configured to close said first switch in response to detecting a demagnetization of a core of a transformer that includes the primary winding and a secondary winding.

3. A control circuit according to claim 1, wherein the charge/discharge circuit includes a second switch, the control circuit further comprising a demagnetizing detector configured to detect a demagnetization of a core of a transformer that includes the primary winding and a secondary winding, and configured to control the second switch in response to detecting the demagnetization of the transformer core.

4. A control circuit according to claim 1, wherein the charge/discharge circuit includes:
   a current generator having a control terminal configured to receive the third signal, the current generator being configured to provide a charge current proportional to the third signal; and
   a second switch configured to couple the current generator to the capacitor, the second switch being configured to selectively provide the charge current to the capacitor.

5. A control circuit according to claim 4, further comprising:
   a demagnetizing detector configured to detect a demagnetization of a core of a transformer that includes the primary winding and a secondary winding, and configured to control the second switch in response to detecting the demagnetization of the transformer core.

6. A control circuit according to claim 5, wherein the charge/discharge circuit includes:

a third switch coupled between the current generator and a ground terminal and having a control terminal coupled to the demagnetizing detector, the demagnetizing detector being configured to open the second switch and close the third switch in response to detecting the demagnetization of the transformer core.

7. A control device according to claim 1, wherein said control device includes the capacitor.

8. A switching current regulator comprising:
a transformer that includes a primary winding and a secondary winding coupled with the primary winding, said primary winding and said secondary winding being configured to be passed through by first and second currents, respectively,
a first switch configured to control said first current; and
a control device configured to control the first switch, the control device including:
a comparator configured to compare a first signal, representative of the, with a second signal;
a capacitor;
a charge/discharge circuit configured to selectively charge and discharge the capacitor; and
a divider circuit configured to generate said second signal as a ratio of a third signal, proportional to the input voltage of the switching current generator, to a voltage on the capacitor.

9. A switching current regulator according to claim 8, wherein the divider circuit is configured to cause the comparator to open said first switch when said first signal equals said second signal, the control circuit further comprising a demagnetizing detector configured to close said first switch in response to detecting a demagnetization of a core of a transformer that includes the primary winding and a secondary winding.

10. A switching current regulator according to claim 8, wherein the charge/discharge circuit includes a second switch, the control circuit further comprising a demagnetizing detector configured to detect a demagnetization of a core of the transformer, and configured to control the second switch in response to detecting the demagnetization of the transformer core.

11. A switching current regulator according to claim 8, wherein the charge/discharge circuit includes:
a current generator having a control terminal configured to receive the third signal, the current generator being configured to provide a charge current proportional to the third signal; and
a second switch configured to couple the current generator to the capacitor, the second switch being configured to selectively provide the charge current to the capacitor.

12. A switching current regulator according to claim 11, wherein the control circuit includes:
a demagnetizing detector configured to detect a demagnetization of a core of the transformer, and configured to control the second switch in response to detecting the demagnetization of the transformer core.

13. A switching current regulator according to claim 12, wherein the charge/discharge circuit includes:
a third switch coupled between the current generator and a ground terminal and having a control terminal coupled to the demagnetizing detector, the demagnetizing detector being configured to open the second switch and close the third switch in response to detecting the demagnetization of the transformer core.

14. A switching current regulator according to claim 8, further comprising a rectifier configured to rectify an alternating current and provide a rectified voltage to the primary winding.

15. A method, comprising:
controlling a switching current regulator that includes a transformer that includes a primary winding and a secondary winding coupled with the primary winding, controlling the switching current regulator including:
providing a comparison signal based on comparing a first signal, representative of a current through the primary winding, with a second signal;
selectively charging a capacitor;
generating said second signal as a ratio of a third signal, proportional to a voltage on the primary winding, to a voltage on the capacitor; and
controlling the current through the primary winding by controlling a first switch based on the comparison signal.

16. A method according to claim 15, wherein controlling the first switch includes opening said first switch in response to determining that said first signal equals said second signal, the method further comprising:
detecting a demagnetization of a core of the transformer; and
closing said first switch in response to detecting the demagnetization of the core.

17. A method according to claim 15, further comprising:
detecting a demagnetization of a core of the transformer; and
discharging the capacitor in response to detecting the demagnetization of the transformer core.

18. A method according to claim 15, wherein the charging includes:
providing a charge current proportional to the third signal; and
selectively providing the charge current to the capacitor.

19. A method according to claim 18, further comprising:
detecting a demagnetization of a core of the transformer; and decoupling the charge current from the capacitor in response to detecting the demagnetization of the transformer core.

20. A method according to claim 19, further comprising:
providing a current path of the charge current to a ground terminal in response to detecting the demagnetization of the transformer core.

21. A method according to claim 15, wherein selectively charging the capacitor includes:
charging the capacitor in response to detecting that current is flowing in the secondary winding; and
discharging the charge current from the capacitor in response to detecting a demagnetization of a core of the transformer.

* * * * *